No. 738,048. PATENTED SEPT. 1, 1903.
E. B. LITTLE.
SALT CELLAR.
APPLICATION FILED NOV. 3, 1902.
NO MODEL.
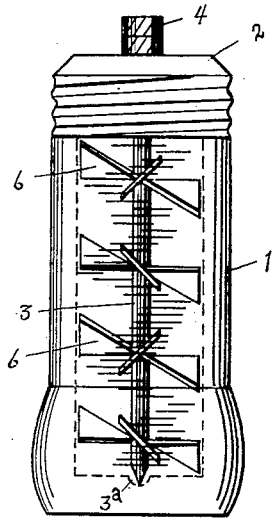
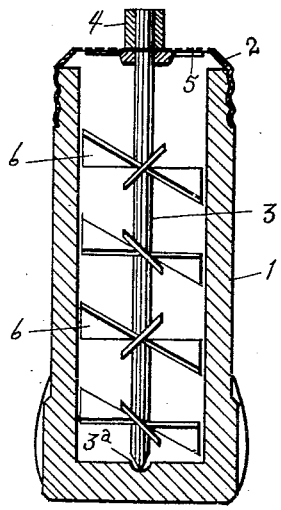
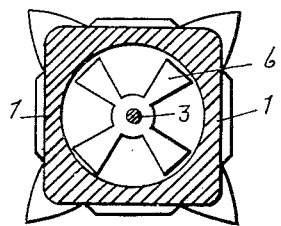
Witnesses
Evert C. Palmer
Geo. A. Hutchinson
Inventor
Edmund B. Little
by Edson Bros.
Attorneys No. 738,048. Patented September 1, 1903.

UNITED STATES PATENT OFFICE.

EDMUND B. LITTLE, OF UNION CITY, TENNESSEE.

SALT-CELLAR.

SPECIFICATION forming part of Letters Patent No. 738,048, dated September 1, 1903.

Application filed November 3, 1902. Serial No. 129,926. (No model.)

*To all whom it may concern:*

Be it known that I, EDMUND B. LITTLE, a citizen of the United States, residing at Union City, in the county of Obion and State of Tennessee, have invented certain new and useful Improvements in Salt-Cellars; and I do hereby declare the following to be a full, clear, and exact description of the invention, such as will enable others skilled in the art to which it appertains to make and use the same.

My invention relates to improvements in salt-cellars, and has for its object to provide such a device with efficient means for agitating the salt or other contents to prepare it for delivery when it has been caked or hardened within the receptacle.

The invention broadly consists of a series of agitators mounted upon a shaft arranged within the receptacle, each of said agitators having its blades inclined oppositely to the blades of the adjacent agitator.

It further consists of a series of radial inclined arms or blades mounted upon a rotatable shaft which bear upon the under side of the top or cover of the receptacle.

In the accompanying drawings, illustrating the preferred embodiment of my invention, Figure 1 is an elevation of my improved device. Fig. 2 is a cross-section, and Fig. 3 is a vertical section.

Referring more particularly to the drawings, 1 indicates a suitable receptacle having the usual perforated top 2 preferably screw-threaded thereon. Within said receptacle is mounted a shaft 3, having its lower end preferably bearing in a recess 3ª in the bottom of said receptacle and its upper end bearing in said perforated top. The upper end of this shaft is provided on the outside of the top or cover with a preferably milled knob 4 for turning the shaft. Said milled knob is composed of two nuts—an upper one, 4ª, and a lower one, 4ᵇ—which are preferably adapted to have screw connection with the end of said shaft projecting above the top or cover. This enables the top to be removed after displacing the shaft by simply unscrewing or otherwise removing these nuts from said shaft. Just below said top a series of radial blades or arms 5 are mounted upon said shaft to bear against the under side of the cover. These arms are preferably disposed at an angle to said top or cover, and by turning them one way they will free any of the contents of the receptacle which may adhere to the top, and by turning them in the opposite direction they will gather some of the contents and force them through the perforations, thereby clearing these openings if they have become clogged. Farther down upon said shafts are arranged agitators 6, which have their blades inclined oppositely to the blades of each of the adjacent agitators.

My device, it will be seen, is provided with means for thoroughly agitating the salt or other contents of the receptacle and will thereby prevent the same from becoming caked or hardened within the receptacle. The blades of the propellers or agitators being inclined oppositely cause the contents of the receptacle to move in varied directions to keep same thoroughly loosened and ready for use.

I am aware that changes may be made in the details of construction and arrangement of parts herein shown and described, and I therefore reserve the right to make such modifications as fairly fall within the scope of my invention.

What I claim as new, and desire to secure by Letters Patent, is—

1. A salt-cellar comprising a receptacle having a perforated cover, a rotatable shaft arranged within said receptacle, and a series of agitators arranged upon said shaft each agitator having blades which are inclined oppositely to the blades of the adjacent agitator.

2. In a salt-cellar the combination of a receptacle having a perforated top, a rotary shaft mounted within said receptacle provided with inclined radial blades which bear against the under side of said top or cover, a series of agitators mounted upon said shaft each agitator having blades which are oppositely inclined to the blades of the adjacent agitator, and means for operating said shaft from the outside.

3. In a salt-cellar the combination of a receptacle, a perforated top therefor, a shaft having bearings in the bottom of said receptacle and in said cover, a knob secured to said shaft for rotating the same, inclined radial blades mounted upon said shaft which bear against the under side of said top or cover, and a series of agitators mounted upon said shaft each agitator having blades which are oppositely inclined to the blades of the adjacent agitators.

In testimony whereof I affix my signature in presence of two witnesses.

EDMUND B. LITTLE.

Witnesses:
S. WADDELL,
J. B. WADDELL.